United States Patent [19]

Sadjadi et al.

[11] Patent Number: 5,606,821
[45] Date of Patent: Mar. 4, 1997

[54] SMART WEED RECOGNITION/CLASSIFICATION SYSTEM

[75] Inventors: Firooz A. Sadjadi, Minneapolis; Michael E. Farmer, Eagan, both of Minn.

[73] Assignee: Loral Corporation, New York, N.Y.

[21] Appl. No.: 257,257

[22] Filed: Jul. 25, 1994

[51] Int. Cl.$^6$ .................................................. A01G 13/00
[52] U.S. Cl. ................................................ 47/1.7; 47/1.01
[58] Field of Search ........................................ 47/1.7, 1.01

[56] References Cited

U.S. PATENT DOCUMENTS

| | | | |
|---|---|---|---|
| 5,144,767 | 9/1992 | McCloy et al. | 47/1.7 |
| 5,222,324 | 6/1993 | O'Neall et al. | 47/1.7 |
| 5,278,423 | 1/1994 | Wangler et al. | 47/1.7 |

*Primary Examiner*—Randolph A. Reese
*Assistant Examiner*—Joanne C. Downs
*Attorney, Agent, or Firm*—Glenn W. Bowen

[57] ABSTRACT

A smart weed recognition and identification system comprises a chlorophyll sensor for detecting green vegetation and memory map means for storing images which contain different forms of green vegetation. The memory maps stored in memory are processed to eliminate the background information and leave a memory map containing only green vegetation. The enhanced memory map is further processed by an operation of segmentation into identifiable regions and the identifiable green vegetation regions are processed to identify unique attributes for each of the regions. The unique attributes for each of the regions is stored in a reference data base library and are used as reference data for comparing other green vegetation with the data stored in the base model by a processor which matches green vegetation in other regions with the green vegetation stored in said reference data base model and further produces decision data signals which are used by a controller to control a plurality of spray nozzles covering the area sensed and for dispensing a plurality of selectable controlled chemicals.

9 Claims, 6 Drawing Sheets

SMART WEED RECOGNITION/CLASSIFICATION SYSTEM

BACKGROUND OF THE INVENTION

1. Related Applications

The present invention is related and is preferably used with our co-pending U.S. application No. 08/254,630, filed Jun. 6, 1994, for an "Improved Chlorophyll Imaging Sensor", now abandoned.

2. Field of the Invention

The present invention relates to systems used to recognize and classify weeds by type, size, shape and texture. More particularly, the present invention relates to a dynamic on-line and real time weed recognition system which is adapted to control the type, amount and timing of herbicide spray heads on a moving platform.

3. Description of the Prior Art

It is well known that agricultural sprays for the control of weeds are usually applied over a complete area in which weeds are to be controlled. More recently, spray systems have been developed which employ sensors and control systems as well as a plurality of individual selectable spray heads. These system are adapted to first locate the vegetation to be sprayed and to activate selective ones of the spray heads to be activated to spray only those areas in which vegetation is sensed or recognized. Such systems are shown in U.S. Pat. No. 5,144,767 which is classified in International Class A01G, Sub-Class 1/12 and U.S. Class 47, Sub-Classes 1.43 and 1.7. Such prior art systems decide to spray if a percentage level of green vegetation is recognizable in the area to be sprayed. While such prior art system are an improvement over the complete area coverage spraying used in the prior art, they failed to recognize the types of weeds, the size and texture of the weeds as distinguished from other vegetation.

Accordingly it would be desirable to provide a weed recognition system for use in controlling a plurality of chemicals or herbicides adapted to control different types of weeds or undesirable vegetation.

SUMMARY OF THE INVENTION

It is a principal object of the present invention to provide a system for recognizing weeds by shape, type, size, color, texture and texture structural properties.

It is a principal object of the present invention to provide a system for recognizing and identifying green vegetation by individual plants grouped into regions for purposes of analysis.

It is another object of the present invention to provide a plurality of image analysis functions on potential green vegetation regions established within a plurality of memory map frames.

It is another object of the present invention to identify and classify green vegetation regions and potentially occluded plants.

It is another object of the present invention to identify and classify the same type of plant even though it may have a different leaf configuration.

It is another object of the present invention to generate control signals for spraying a plurality of weed specific chemicals simultaneously onto a predetermined area.

It is another object of the present invention to dynamically build an image base data bank of useful vegetation attributes which permit refinement and optimization of the functions used in the process of recognizing certain types of vegetation.

According to these and other objects of the present invention a smart weed recognition and identification system is provided which comprises a green vegetation sensor which is adapted to supply standard TV color signals and a vegetation index ratio to a frame grabber and memory storage device that is adapted to store a memory map of the sensed vegetation. The stored vegetation data in the memory map is first enhanced and then a plurality of image analysis functions are performed on the vegetation regions identified in the memory map frame which includes texture segmentation and occlusion resolution, edge analysis and region clustering. During a teaching operation, the results of the analysis functions are stored in a plant library as base models. Subsequently, other areas of vegetation are sensed as regions and subjected to the plural image analysis functions and then the results are compared with the reference base models learned during the teaching operation. Matching is employed to identify plant types, shape, size, color and texture and to generate control signals capable of controlling selectable plural spray heads and selectable plural chemicals.

DETAILED DESCRIPTION OF THE PREFERRED EMBODIMENTS

Figure 1:
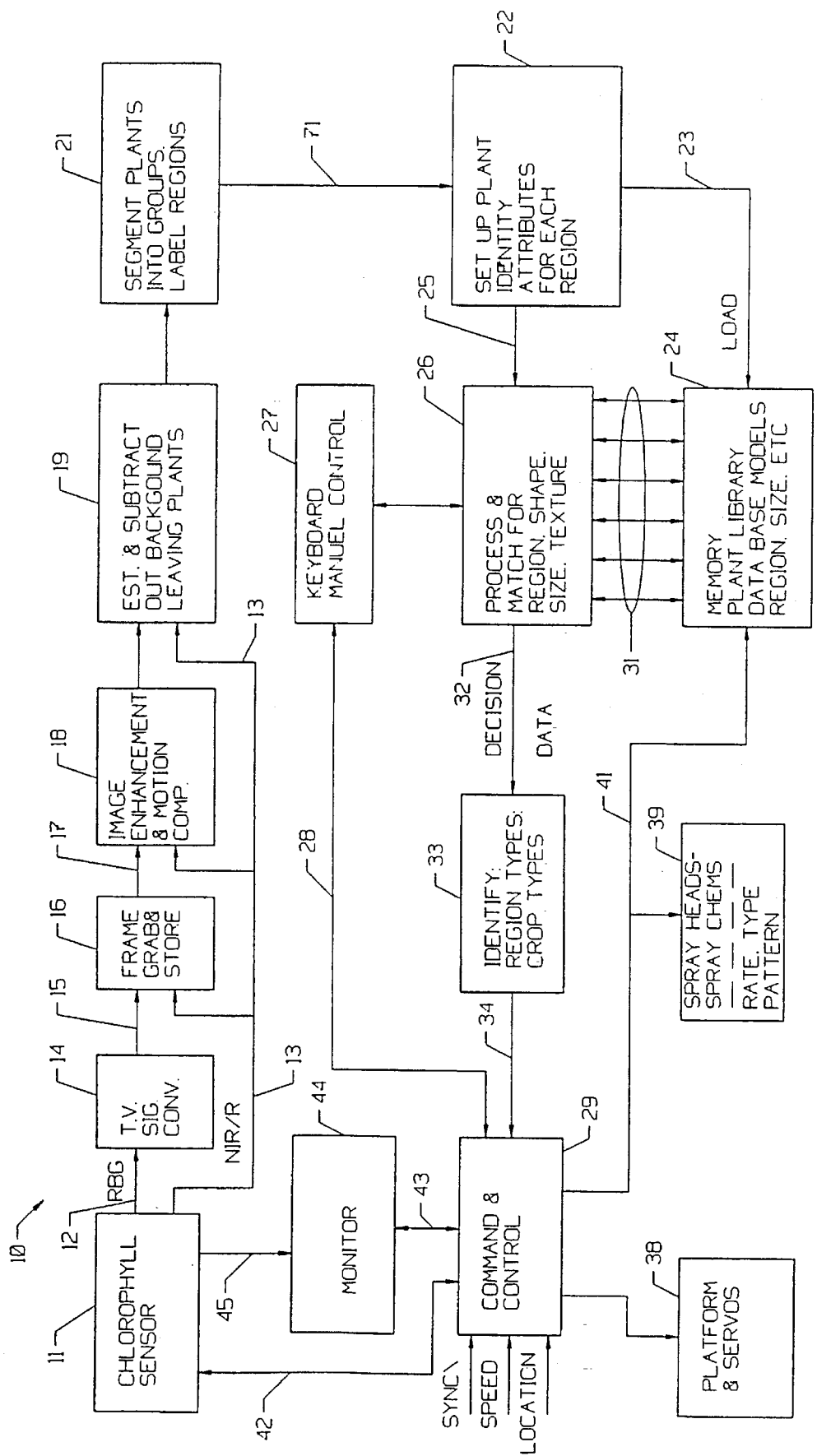
FIG. 1 is a schematic block diagram of the present invention novel smart recognition and classification system.

Refer now to FIG. 1 showing a block diagram of the preferred embodiment of the present invention novel smart weed recognition and classification system 10. Information used by the novel system is preferably supplied by a chlorophyll sensor 11 which is capable of generating red, blue and green television compatible signals on line 12 and a vegetation index ratio signal NIR/R on line 13. While a chlorophyll sensor is preferred such as that shown and described in our aforementioned copending U.S. application No. 08/254,630, it is possible to modify other types of chlorophyll and green vegetation sensors to operate in conjunction with the weed recognition systems to be described herein. The television compatible signals on line 12 are coupled to a TV signal converter 14 which generates TV signals on line 15 that are applied directly to a frame grabbing and storing memory 16 which is also provided with an input of the vegetation index ratio on line 13. It will be understood that the four color inputs to the frame grabbing and storing memory 16 are capable of being controlled so as to provide a desired predetermined frame map image on line 17. The frame map image is enhanced by improving the resolution and compensating for motion in block 18. The enhanced image map shown in block 18 is refined by making an estimate and subtracting out the background leaving a clean memory map of green vegetation or plants as shown in block 19. It will be understood that in order to perform the functions of enhancement explained with regards to blocks 18 and 19, the vegetation ratio NIR/R is a desired input as shown on line 13.

The information used in block 21 is shown labeled as segmenting plants into groups and labeling regions. This functional operation will be explained in greater detail hereinafter and includes other operations which are extremely desirable for the correct analysis of the memory map regions which identify the vegetation by plant size, etc. After the green vegetation is segmented into regions, the regional information is then analyzed to identify the plants by their attributes which are defined for each of the regions as shown in block 22. The same information that is used to set up the plant identity and its attributes for each of the regions is also information which is loaded via line 23 into an archive memory plant library which contains the data identifying the base models, their region, size, etc. During a teach operation, it is necessary to either use information previously stored in the plant library 24 or to load new information generated in blocks 21 and 22 into the memory library 24 for identifying plants to be treated using the plant identification stored in the plant library 24. After the plant library 24 is sufficiently enabled with the proper information for identifying plants, the information which subsequently is being examined as the sensor 11 is moved on its platform through a field, is supplied via line 25 to the block 26 labeled process and match for regions, for size, for shape, for texture, etc. During the teach operation, it is possible to use the manual control keyboard 27 which is coupled to block 26 to blocks 22 and 24 to call up information and run a series of test programs which will optimize the identification of the plants being subsequently examined during a run operation. The keyboard 27 is also shown coupled via line 28 to a command and control block 29 which will be explained hereinafter. Even though not shown, the control lines from the keyboard and manual control 27 of the processing means 26 are connected to other elements of FIG. 1 to complete a manual and step control of each of the elements. Block 26 is shown coupled to the plant library 24 via parallel lines 31 which are used to perform the match or comparison operation to determine the identify and label the types, size, shape, texture, etc. of the plants. The decision information is generated on line 32 and the functional results are shown in block 33 as identifying the region, types, plants, crops, etc.

In summary, the same information that is used in the comparison and match process has undergone the plurality of imaging processing operations that are used to identify the plants and also to store the identifying data in the plant library 24. Different plants under different growth conditions and different background will require emphasis on different sets of image analysis operations. However, the image analysis operation selected at the keyboard 27 are more than capable of identifying the regions and the plants by shape, size, texture, etc. This information is employed to generate signals to block 33 which is functionally contained within the processing means block 26. The output on line 34 is connected to the command and control block 29. The signals which identify the type of plant or weed and its size and texture and shape are signals which are employed in the command and control block 29 to determine the amount of and type of chemicals to be used to spray the previously identified vegetation. It will also be understood that the system is not necessarily limited to spraying herbicides and weed control chemicals but may also be used to fertilize areas containing mixed vegetation or isolated vegetation.

The command and control block 29 is shown having a sync input, a speed input, and a location input on lines 35 to 37. This information is necessary for timing the dispensing of chemicals being sprayed from a moving platform which has servos as shown in block 38. As will be explained hereinafter, it is possible to have a cluster of spray heads in a single plural spray head or have a spray head with plural inputs which are operated simultaneously to mix the chemicals to be used with the present invention. Thus, the command and control 29 sends signals to the spray heads as well as to control valves to spray chemicals and control the rate, time and type patterns as shown in block 39. The control line 41 from the command and control 29 which controls the spray heads 39 may also be supplied to the archival memory and plant library 24 and stored in such a form as to be recovered to generate information which describes the amount and type of chemicals sprayed throughout and entire field. At a future date, this information may be extremely important in determining the effectiveness of the spray operation.

The command control unit 29 is shown coupled via line 42 to the chlorophyll sensor 11 and via line 43 to a monitor 44 which has a second input from the chlorophyll sensor via line 45 to enable the command and control unit to monitor the information being received by the chlorophyll sensor. In some embodiments of the present invention, the chlorophyll sensor may already be provided with a monitor or display for observing the sensor 11 inputs to the system 10.

In summary, the present invention preferably employs a chlorophyll sensor 11 which supplies not only the color information of the vegetation but a vegetation index NIR/R. The information received from the sensor is processed either in a custom design frame grabber or in some type of computing system which will perform a frame grabbing operation. Such frame grabbers are available for insertion into standard personal computers and such devices may be employed which would be cheaper than designing a complete customer frame grabbing and storing operation. Once the information is stored in a memory as a memory image map, this information can then be further processed by a computing system to perform the novel image analysis operations to be defined in greater detail hereinafter.

Figure 2:
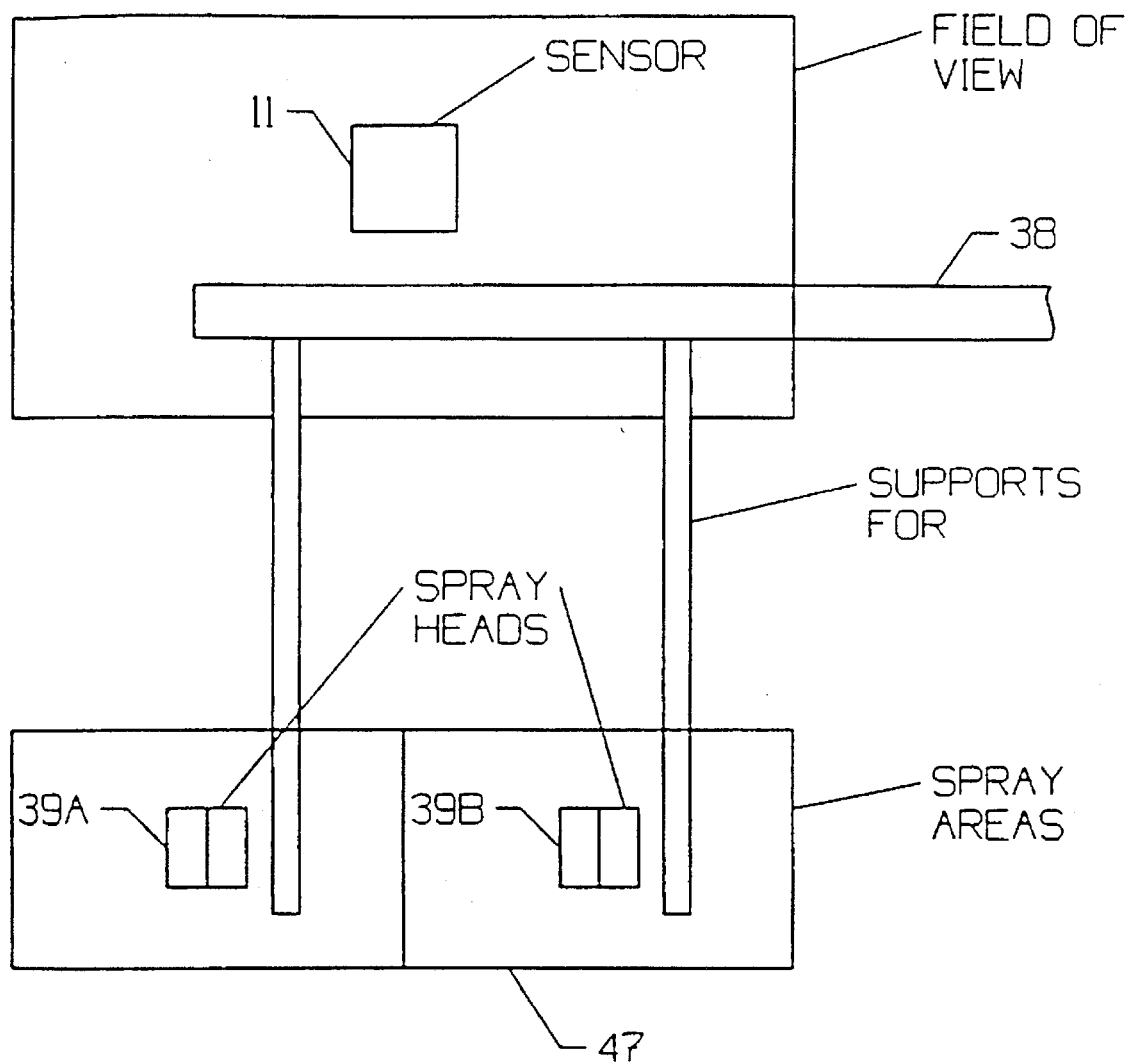
FIG. 2 is a schematic drawing of a sensor and its field of view and spray heads and their area being sprayed.

Refer now to FIG. 2 showing a schematic drawing of a sensor 11 and its field of view 46 and a plurality of spray heads 39A and 39B and their overlapping spray areas 47. The sensor and spray heads are supported by a platform 38 which is preferably movable by servos (not shown). It will be understood that the sensor in FIG. 2 senses an area of vegetation prior to the time the spray heads 39 pass over the area previously viewed. In a moving and dynamic system, the image obtained by the frame grabbing operation is blurred and can be substantially enhanced by performing a motion compensation correction operation previously explained in reference to block 18 of FIG. 1. Further, green vegetation is supported by soil which contains various forms of moisture, texture and contours. This background information should be subtracted out to provide the ideal and enhanced map or frame that contains the vegetation to be analyzed.

Figure 3:
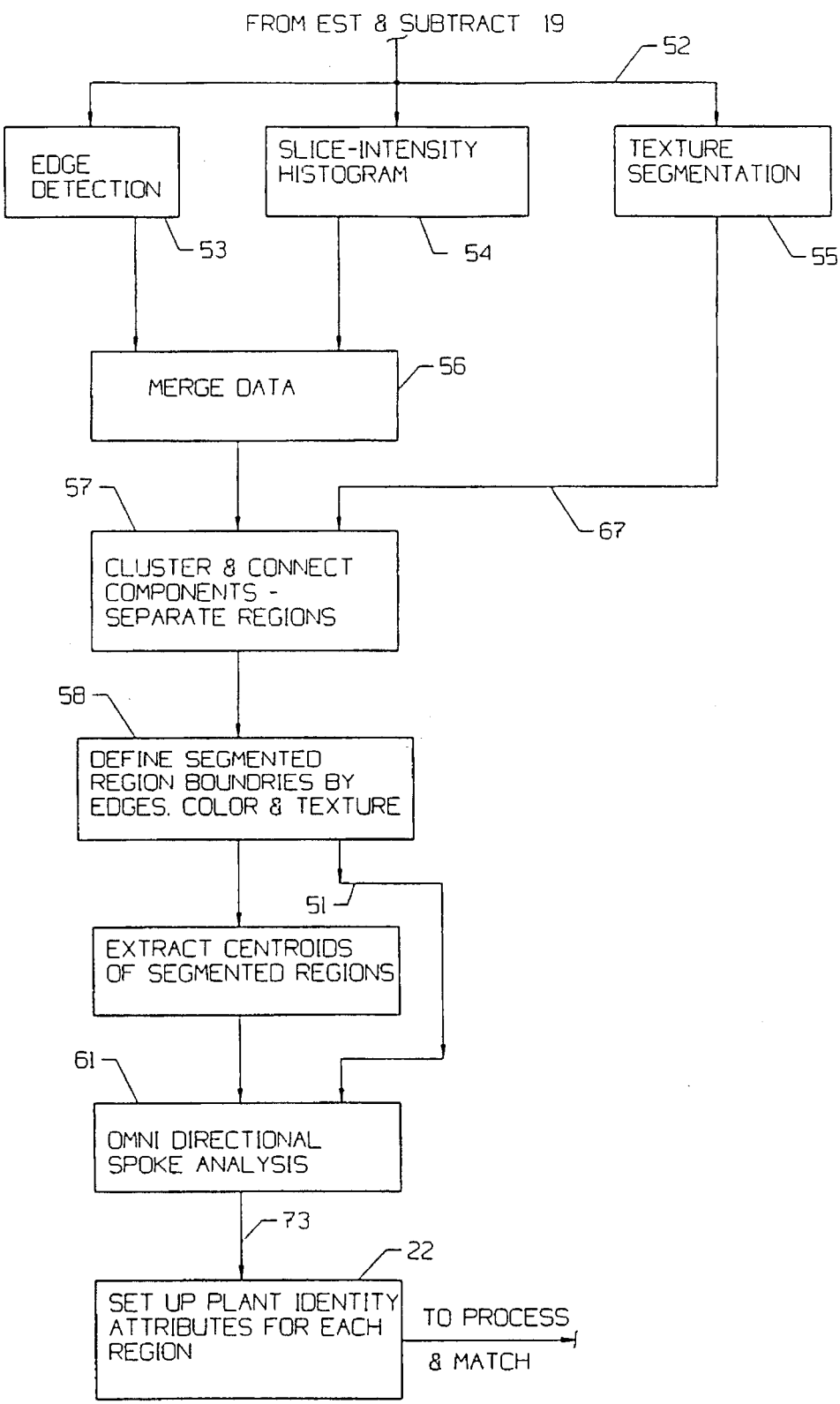
FIG. 3 is a schematic block diagram of the operation of plant segmentation performed in FIG. 1.

Refer now to FIG. 3 showing a schematic block diagram of the operation of plant segmentation performed in block 21 of FIG. 1. The output from block 19 serves as an input on line 52 to three blocks labeled edge detection 53 sliced intensity histogram 54 and texture segmentation 55 which will be explained in greater detail hereinafter. The results of edge detection and slice intensity histogram analysis are merged in block 56 and the results of this merger are included as an input into block 57 where the clustering and connecting of components as well as the separation into regions is performed. An additional input on line 67 from the texture segmentation block 55 is provided as an input to block 57. The results of the separation into regions permits the processor of the system 10 to now define the segmented region by boundaries its edges, its color and texture as shown in block 58. After defining the regions to be analyzed it is now possible to find their centers or centroids as segmented regions as shown in block 59. Once the centroids of the segmented regions are established in block 59, it is now possible to perform a functional analysis entitled omni directional spoke analysis as shown in block 61. Information from the block 58 is also employed in the block 61 analysis. After obtaining all of the low level properties from the image analysis, these properties may be further analyzed to obtain and identify high level attributes which will permit the identification of the plants of each of the regions as shown in block 22 as previously described with reference to FIG. 1.

Figure 4:
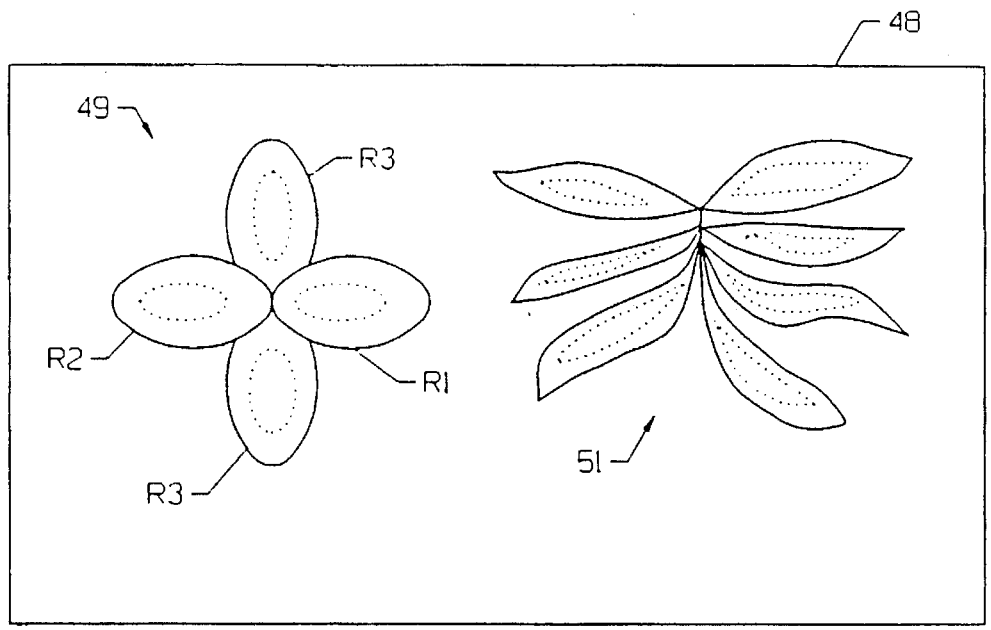
FIG. 4 is a schematic block drawing of a display of a memory map showing green vegetation after being enhanced and the background information removed.

Refer now to FIG. 4 showing a schematic drawing of a display of a memory map image of the aforementioned green vegetation after being enhanced and the background removed. The memory map image shown at the area 48 is shown having a plant 49 and a plant 51 which are different to the human eye. The analysis of the attributes of the plants 49 and 51, though decidedly different in shape may have some similar attributes. Thus, it is necessary to analyze numerous attributes which define the differences in the plants 49 and 51 which will permit their identification as types of plants. The preferred analysis of attributes in the present invention includes the attributes of intensity, color, size, shape, texture, structural signature and structural relationship.

Figure 5:
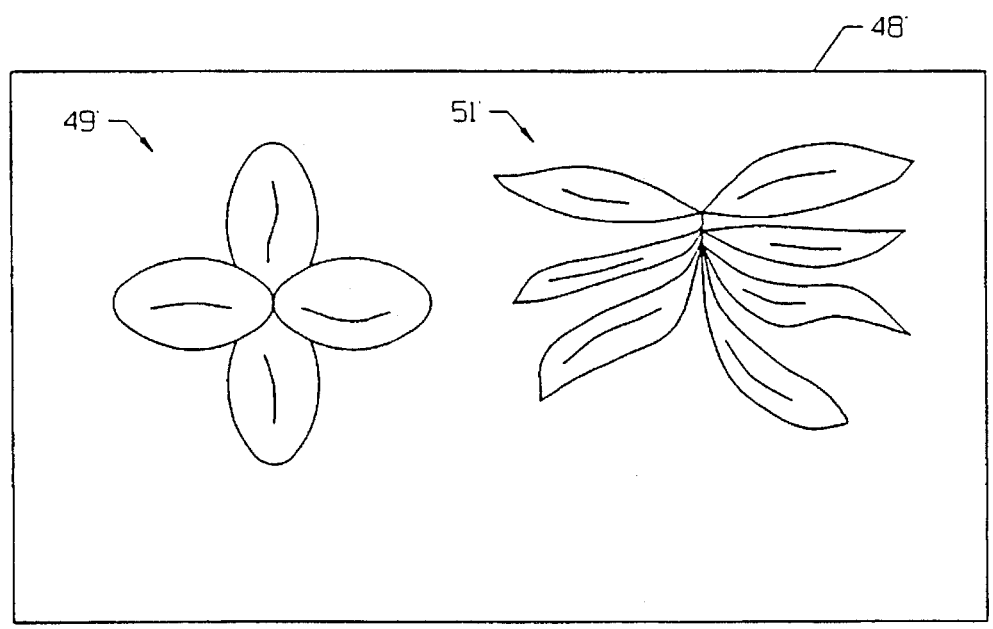
FIG. 5 is a schematic drawing of a display of the memory map of FIG. 4 after edge detection is performed as shown in FIG. 3.

Refer now to FIG. 5 showing a schematic drawing of the memory map image shown in FIG. 4 after the operation of edge detection has been performed. Thus, the plants 49 and 51 are now defined by very precise lines or edges and are designated as plants 49' and 51' in image memory map 48'. The functional operation of edge detection was previously performed in block 53 of FIG. 3 and the information contained therein is necessary for performing some of the other functional operations in the block shown in FIG. 3.

Figure 6:
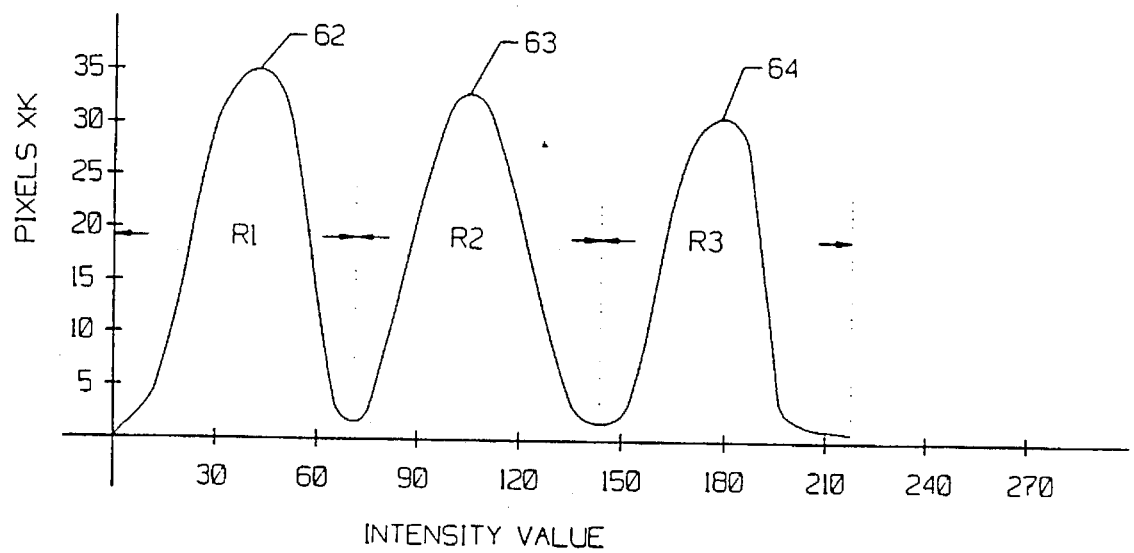
FIG. 6 is a schematic drawing used to explain a histogram slicing operation performed in FIG. 3.

Refer now to FIG. 6 showing a schematic drawing which will be used to explain a histogram slicing functional operation. The three peaks 62, 63 and 64 are the results of analyzing three separate and independent regions R1, R2 and R3 contained in an image memory map 48. Each of the regions to be analyzed contains a number of pixels inside of the region having different values of intensity. The number of pixels which have the same or substantially the intensity same may be plotted as a number of pixels versus the intensity. Thus for the region defined by R1 there are 35 times the factor K number of pixels having an intensity value of 34. In similar manner, a sub region within a plant or region R2 has higher intensity may be defined by the wave form 63 which has similar number of pixels at the higher intensity value 33 at the peak 63. The third sub region is shown as R3 having a peak 64. In order to better explain this information which is used to analyze the plants 49 and 51 shown in FIG. 4, two of the dark leaves of plant 49 have been labeled R3 because of their darkness and similar intensity. These two sub regions R3 may be definable separately, but if located close enough together, they may be merged into a region. The light leaf is labeled R1 and the intermediate intensity leaf is labeled R2. Thus, having explained that the regions R1, R2 and R3 as sub regions of a plant of larger regions, it will be appreciated that the sub region R2, R3 and R1 may easily overlap each other as intensity values but have been shown separately for ease of explanation of histogram slicing as shown in block 54 of FIG. 3.

Figure 7:
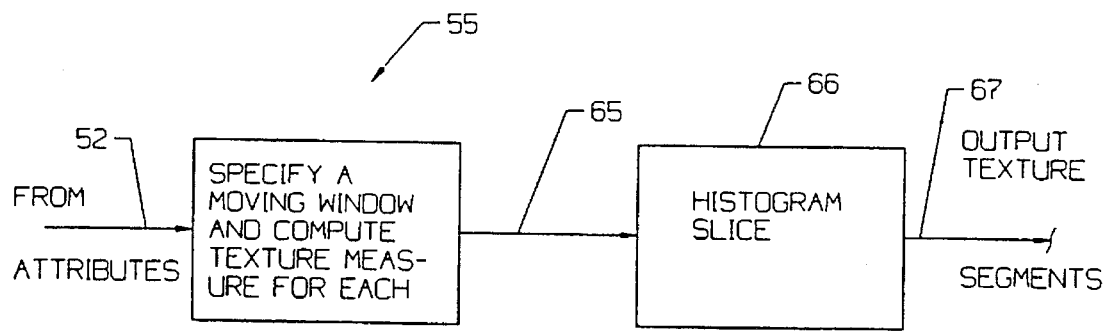
FIG. 7 is a schematic block diagram used to explain a texture segmentation operation.

Refer now to FIG. 7 showing a schematic block diagram which will be used to explain texture segmentation operations. The input on line 52 was previously shown on FIG. 3 as an input to block 55 in which the texture segmentation operation is performed. In order to perform a preferred embodiment texture segmentation operation, it is first necessary to take all of the information in an image map display and specify a much smaller window which may be defined by a number of pixels in the X and Y direction. This particular window is effectively placed over a small area within the image map and the value of the values of the pixels within the window are examined for a painting texture measure. There are numerous acceptable measures of texture, however, a preferred measure of texture for purposes of this invention may be average intensity and standard deviation from average intensity. The window is moved one pixel at a time over the entire image map and the output of this operation at each window position is used to provide another image on line 65. The new image generated on line 65 is now analyzed and undergoes the histogram slice operation previously explained with reference to FIG. 6. The output from the histogram slice operation in block 66 provides an output of group intensity values on line 67 of the type shown and explained hereinbefore with reference to FIG. 6. The only difference which now occurs is that the histogram slice is a texture mixture slice and not an intensity value slice. The output of the texture segmentation from block 66 is shown provided as an input on line 67 to the clustering and connecting operation performed in block 57 of FIG. 3. The output of the histogram slice operation in block 66 is the output on line 67.

Figure 8:
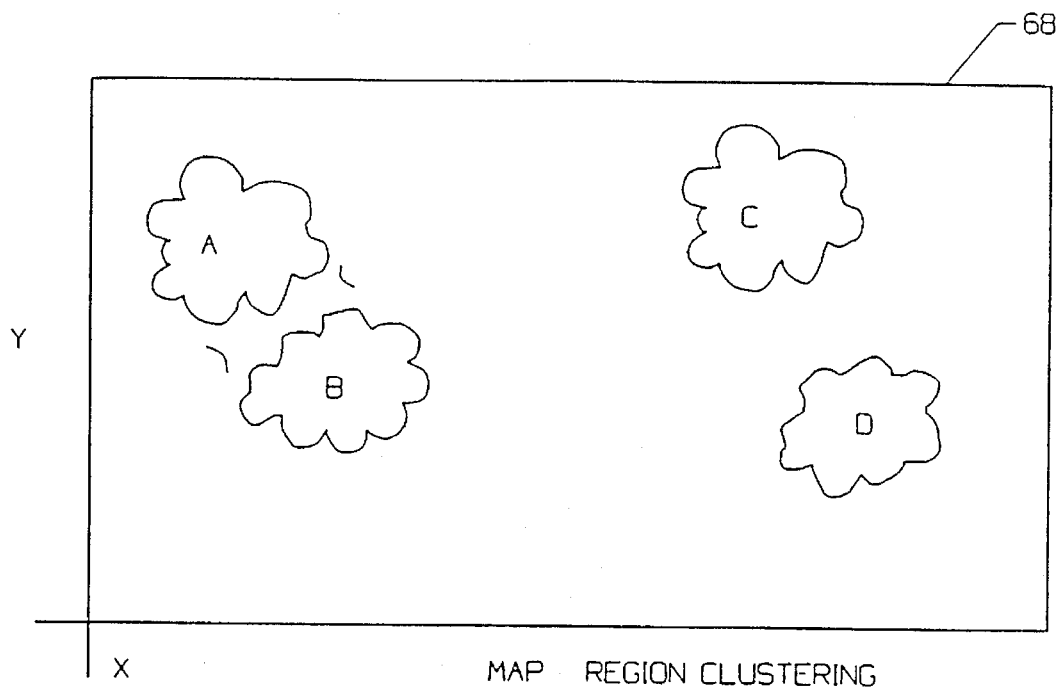
FIG. 8 is a schematic drawing of a memory map used to explain clustering and connecting of components into separate regions.

Refer now to FIG. 8 showing a schematic drawing of a memory map 68 used to explain clustering and connecting of components into separate regions. Memory map 68 is shown containing four identifiable clustered regions labeled respectively as clustered regions A to D. It is now possible to perform the operation in block 57 of FIG. 3 by employing the edge detection information and the slice intensity information and the texture segmentation information to define the boundaries and other attributes of the cluster regions A, B, C and D as separate and identifiable regions within the memory map 68. Now that these cluster regions have been segmented and identified, it is possible to add further attributes which identify these regions as shown in block 58. For example, the aforementioned low level attributes may now be applied to the cluster regions to more particularly and specifically identify these regions.

Figure 9:
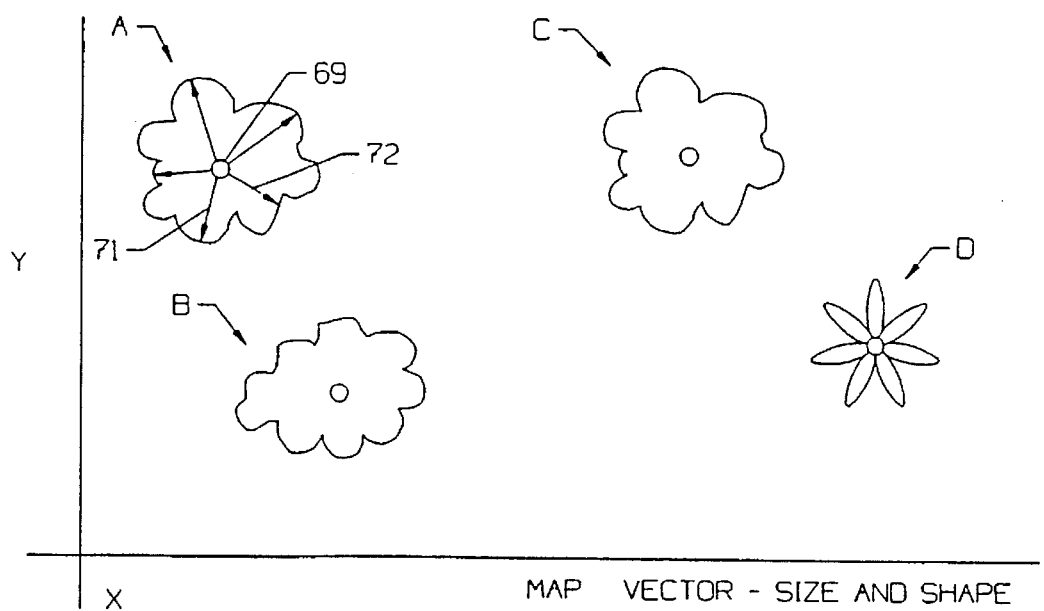
FIG. 9 is a schematic drawing of a memory map used to explain omni directional spoke analysis.

Refer now to FIG. 9 showing a schematic drawing of a memory map used to explain omni directional spoke analysis. The aforementioned regions A to D may now be functionally analyzed to identify their centroids such as centroid 69 shown at the center of the area of cluster A. Additional centroids are shown in cluster regions B to D but need not be defined further for purposes of this explanation. A plurality of vectors are shown as vectors 71, 72 which extend from the centroid to the maximum extent of the outside area of the clustered region A. For example, this information is capable of identifying length, width and number of leaves as well as their distribution. This information is performed respectively at the blocks 59 and 61 of FIG. 3. Having performed each of the functional operations shown in FIG. 3 within the segmentation block 21 shown in FIG. 1, it will be appreciated that the information being supplied as an output on line 73 to the block 22 is nothing more than a list of low level attributes which define each of the segmented or clustered regions of the type shown in FIGS. 8 and 9 within a memory map 68.

Having explained a preferred embodiment of the present invention, it will be understood that the recognition system defined and described hereinbefore may be employed with other types of sensors to perform different types of automatic target recognition. For example, a chlorophyll sensor may be used with the present recognition system to identify targets that are embedded or camouflaged in high density green vegetation. Further, the present system may be used for surveillance and reconnaissance wherein memory maps are taken from time to time to observe the changes that are made in the area being surveyed. As a further example, it is possible to substitute the chlorophyll sensor with some of the latest types of infrared sensors and to observe targets which emit high amounts of infrared radiation in other bands. In this case, the region now becomes the object to be surveyed and the background information is eliminated and attributes are made for each of the objects (regions) and stored in the memory library or archives 68 so that later identification of similar objects will be performed in the matching operation.

What is claimed is:

1. Apparatus for recognizing and controlling weeds growing in a field of desired vegetation, comprising:

sensor means for detecting green vegetation in said field, first memory means for storing a vegetation memory map of said field to provide a vegetation image representative of different forms of green vegetation in said field, means for eliminating background information from said vegetation memory map to produce an enhanced vegetation memory map in said memory means, means for segmenting said enhanced vegetation memory map into identifiable map regions corresponding to unique field regions of said field, means for establishing data representative of unique attributes for each of said map regions, second memory means for storing reference data base models of the green vegetation defining each of said regions, processing means for matching each enhanced vegetation memory map region with said stored reference data base model of the corresponding region, said processing means being coupled to a dynamic controller means for controlling a plurality of the ejection of weed-controlling fluids through spray nozzles wherein said spray is dispensed into said regions, wherein said sensor means comprises a chlorophyll sensor for generating TV color compatible signals red, blue and green and an index ration NIR/R, wherein said processing means further comprises means for identifying the regions of green vegetation by size, shape color, texture and spectral properties, and wherein said dynamic controller means is constructed to control chemicals that are ejected from a plurality of spray heads which are constructed to spray selected isolated green vegetation with different chemicals.

2. Apparatus as set forth in claim 1 wherein said processing means further includes means for providing edge analysis of said data.

3. Apparatus as set forth in claim 1 wherein said processing means further includes means for providing for manipulating said data to represent subregion clusters of said green vegetation.

4. Apparatus as set forth in claim 1 wherein said processing means further includes means for the directional spoke analysis on said data.

5. A method of recognizing classifying and controlling weeds in an area containing green vegetation, comparing the steps of:

sensing green vegetation in said area with a green vegetation sensor, storing data from the sensed area in a digital memory map in digital form, processing the digital memory map of the sensed area to eliminate background information from the digital memory map to produce a digital memory map of only the green vegetation, segmenting the green vegetation into identifiable regions, establishing unique attributes for the green vegetation for each of said regions, matching the unique attributes of regions sensed with previously stored unique attributes to determine if, any of said regions contain weeds to be controlled, and generating signals for controlling a plurality of spray nozzles covering the area sensed for dispensing weed controlling chemicals into said weeds.

6. The method as set forth in claim 5 which further includes segmenting the regions of green vegetation into identifiable sub regions.

7. The method as set forth in claim 6 wherein said step of establishing said unique attributes comprises the step of classifying said sub regions by size, shape and color.

8. A method as set forth in claim 7 which further includes the step of classifying said sub regions by texture and spectral properties.

9. A process for recognition of growing plants in an area of the earth comprising:

sensing electromagnetic radiation from said area, deriving size, color and texture information from sensed electromagnetic radiation, defining segmented image regions of said area that differ from the remaining portions of said areas based upon said size, color and texture information, determining the centroids of each of said segmented image regions, and scanning said segmented image regions in a spoke pattern from each centroid outwardly so as to identify the shapes of each of said segmented image regions.

* * * * *